United States Patent [19]
Nakano

[11] Patent Number: 6,085,727
[45] Date of Patent: Jul. 11, 2000

[54] FUEL INJECTION METHOD AND APPARATUS FOR ENGINE

[75] Inventor: Futoshi Nakano, Kanagawa-ken, Japan

[73] Assignee: Isuzu Motors Limited, Tokyo, Japan

[21] Appl. No.: 09/155,806

[22] PCT Filed: Mar. 3, 1998

[86] PCT No.: PCT/JP98/00876

§ 371 Date: Oct. 6, 1998

§ 102(e) Date: Oct. 6, 1998

[87] PCT Pub. No.: WO98/39561

PCT Pub. Date: Sep. 11, 1998

[51] Int. Cl.[7] .................................................. F02M 7/00
[52] U.S. Cl. .......................................... 123/447; 123/456
[58] Field of Search .................................. 123/456, 446, 123/447, 494, 357

[56] References Cited

U.S. PATENT DOCUMENTS

| | | | |
|---|---|---|---|
| 4,884,545 | 12/1989 | Mathis | 123/447 |
| 5,176,115 | 1/1993 | Campion | 123/446 |
| 5,176,120 | 1/1993 | Takahashi | 123/447 |
| 5,176,122 | 1/1993 | Ito | 123/447 |
| 5,697,343 | 12/1997 | Isozumi | 123/456 |
| 5,711,274 | 1/1998 | Drummer | 123/456 |
| 5,713,326 | 2/1998 | Huber | 123/447 |
| 5,896,841 | 4/1999 | Nemoto | 123/456 |

FOREIGN PATENT DOCUMENTS

| | | |
|---|---|---|
| 5-106495 | 4/1993 | Japan . |
| 5-125985 | 5/1993 | Japan . |
| 6-058217 | 3/1994 | Japan . |
| 6-093915 | 4/1994 | Japan . |
| 6-511527 | 12/1994 | Japan . |
| 7-012027 | 1/1995 | Japan . |
| 8-232703 | 9/1996 | Japan . |

*Primary Examiner*—Carl S. Miller
*Attorney, Agent, or Firm*—Browdy and Neimark

[57] ABSTRACT

This fuel injection method and apparatus for an engine obtain an accumulator pressure at fuel injection time from an approximate function obtained on the basis of the pressure of working fluid in an accumulator, which pressure is detected at a constant sampling period, and accurately control the operating time duration of a control valve for the working fluid in each injector. An approximate function Pr(t) of accumulator pressure is obtained on the basis of a plurality of detected values $Pr_1$ to $Pr_n$ of accumulator pressure which are obtained at a constant sampling period Ts. A set value Prs of accumulator pressure at fuel injection time $T_{inj}$ is obtained from the approximate function Pr(t), and a control valve driving time duration required to execute a target injection quantity is obtained on the basis of the set value Prs. During the driving time duration, fuel is injected from the injectors by the operation of the control valves.

12 Claims, 10 Drawing Sheets

FUEL INJECTION METHOD AND APPARATUS FOR ENGINE

TECHNICAL FIELD

This invention relates to a fuel injection method and apparatus for an engine both of which inject fuel into combustion chambers from injectors by using the pressure of working fluid pressurized by a pump and stored in an accumulator.

BACKGROUND ART

Regarding fuel injection control for an engine, an accumulator fuel injection system is known as a method of increasing injection pressure and optimally controlling injection conditions such as fuel injection timing and fuel injection quantity according to the operating state of the engine. The accumulator fuel injection system is a system which stores in an accumulator a working fluid for fuel injection control pressurized at a predetermined pressure by a pump and injects fuel into combustion chambers from the corresponding injectors by using the pressure of the working fluid. In the accumulator fuel injection system, a controller controls the pressure of the accumulator and control valves provided in the respective injectors so that the pressurized fuel can be injected from the injectors under injection conditions optimum for the operating state of the engine.

Conventionally, two types of accumulator fuel injection systems are known. One type of accumulator fuel injection system is a system which uses a high-pressure working oil different from fuel as its working oil. In this system, the high-pressure working oil is stored in a high-pressure oil manifold which serves as an accumulator, and pressure intensifying pistons are driven by using the pressure of the working oil to intensify the pressure of the fuel on the basis of the ratio of a larger area at one end of each of the pressure intensifying pistons which are exposed to a pressure chamber into which to introduce the high-pressure working oil to a smaller area at the other end of each of the pressure intensifying pistons which are exposed to pressure intensifying chambers into which to introduce the fuel, and the pressure-intensified fuel is injected into combustion chambers from injection holes formed in the tip ends of the respective injectors.

This type of accumulator fuel injection system will be described below with reference to FIGS. 9 and 10. In a fuel supply system in the engine shown in FIG. 9, fuel is supplied to an injector 1 of each cylinder of the engine from a common rail 51 which is a common passage for fuel supply. Fuel in a fuel tank 52 is supplied to the common rail 51 through a fuel filter 54 by the driving of a fuel pump 53. The injector 1 communicates with the common rail 51 through a fuel supply port 11 and a fuel discharge port 12, and an extra fuel is returned to the fuel tank 52 through a fuel return passage 55.

A high-pressure working fluid which differs in line from fuel, i.e., working oil, is supplied to each of the injectors 1 to intensify fuel pressure. That is to say, the injectors 1 are connected to a high-pressure manifold 5 which serves as a common accumulator. Oil in an oil reservoir 57 is fed out to an oil supply passage 61 by the operation of an oil pump 58. An oil cooler 59 and an oil filter 60 are provided halfway along the oil supply passage 61. The oil supply passage 61 branches into a lubrication system passage 67 which leads to an oil gallery 62 and a working oil system passage 66 connected to a high-pressure oil pump 63. The supply of oil to a high-pressure oil manifold 56 from the high-pressure oil pump 63 provided at the working oil system passage 66, that is, the oil pressure in the high-pressure oil manifold 56, is controlled by a flow control valve 64. An extra oil is returned to the oil reservoir 57 through an oil return passage 65. A controller 50 is arranged to execute control of the flow control valve 64 and control of solenoids 10 of the respective injectors 1. An engine speed Ne detected by an engine-speed sensor 68, a depression quantity of an accelerator pedal detected by an accelerator depression quantity sensor 69, that is, an accelerator depression quantity Acc, and a crank angle detected by a crank angle sensor 70 are inputted to the controller 50 as the operating status of the engine. In addition, a working oil pressure of the high-pressure oil manifold 56 detected by a pressure sensor 71 installed on the high-pressure oil manifold 56 is inputted to the controller 50.

As shown in FIG. 10, each of the injectors 1 used in this accumulator fuel injection system includes a body in which a hollow bore and an injection hole 13 are formed, and a case 6 which forms a clearance to form a fuel chamber 20 outside the body. The body of the injector 1 includes a nozzle body 2 provided with a hollow hole 46 and formed with the injection hole 13, a fuel supply body (plunger barrel) 5 which forms a pressure intensifying chamber 7, a hollow spacer body 21 positioned between the nozzle body 2 and the fuel supply body 5 and provided with a spacer body 81 and a hollow bore 29, an injector body 4 provided with a pressure chamber 8 to which to supply a high-pressure working oil, and a solenoid body 3 provided with a drain groove 39 and a drain passage 38 as a leak passage and having a solenoid valve 16 as a control valve. The case 6 surrounds the nozzle body 2, the spacer body 81, the hollow spacer body 21 and the fuel supply body 5 so as to form the fuel chamber 20. One end of the case 6 is sealed by being engaged with an abutment face 14 provided at a step portion of the nozzle body 2, while the other end of the case 6 is sealed by a fitting surface 80 screwed into the injector body 4, so that the fuel chamber 20 is formed between the case 6 and the body. The fuel supply port 11 and the fuel discharge port 12 which are formed in the case 6 are opened to the common rail 51, and fuel is supplied from the common rail 51 to the fuel chamber 20 at all times.

The injector 1 has the pressure intensifying chamber 7 which is formed in the fuel supply body 5 so that the pressure of fuel supplied from the fuel chamber 20 is intensified, a fuel passage 22 which is formed to extend through the spacer body 81, the hollow spacer body 21 and the nozzle body 2 so that the fuel is supplied from the pressure intensifying chamber 7 to the injection hole 13, a needle valve 23 which is slidably held in the hollow hole 46 of the nozzle body 2 and opens the injection hole 13 by fuel pressure, a pressue intensifying pis ton 9 w hich intensifies the pressure of the fuel of the pressure intensifying chamber 7, the pressure chamber 8 to which to supply a high-pressure working oil which applies a high pressure to one end of the pressure intensifying piston 9, and the solenoid valve 16 which controls the supply of the high-pressure working oil to the pressure chamber 8.

A return spring 18 is disposed in the hollow bore 29 formed in the hollow spacer body 21, and applies its spring force to the needle valve 23 in a direction in which the injection hole 13 is closed. One end of the return spring 18 abuts against the top end of the needle valve 23, while the other end of the return spring 18 abuts against the spacer body 81. A hollow spring chamber 30 which is formed by a hollow bore 26 formed in the injector body 4, and is formed between an end face of a larger-diameter portion 25 of the pressure intensifying piston 9 and an end face of the fuel supply body 5. A return spring 17 which urges the pressure intensifying piston 9 toward the pressure chamber 8 to restore the pressure intensifying piston 9 is dispose d under compression in the spring chamber 30. A return spring 19 which urges the solenoid valve 16 toward a side of cutting off the working oil is disposed in a hollow hole 85 formed in the injector body 4. The spring chamber 30 in which the pressure intensifying piston 9 is disposed communicates with the fuel chamber 20 through a discharge passage 83 formed in the fuel supply body 5 and a check valve 84 disposed in the discharge passage 83.

The fuel from the fuel chamber 20 normally leaks into the spring chamber 30 through a slight clearance 28 at the sliding surface between a hollow bore 42 of the fuel supply body 5 and the peripheral surface of a smaller-diameter portion 24 and through a slight clearance 48 at the abutment surface between the injector body 4 and the fuel supply body 5, and the pressure in the spring chamber 30 is equal to the fuel pressure in the fuel chamber 20.

The pressure intensifying piston 9 includes the smaller-diameter portion 24 which serves as a plunger which forms part of the pressure intensifying chamber 7 at its bottom end, the larger-diameter portion 25 which forms part of the pressure chamber 8 at a top face 73, and a guide ring portion 41 which extends downwardly from the whole circumference of a peripheral portion 47 of the larger-diameter portion 25 to slide on the internal surface of the hollow bore 26. The guide ring portion 41 has the function of stabilizing the upward and downward movement of the pressure intensifying piston 9. The smaller-diameter portion 24 of the pressure intensifying piston 9 reciprocates in the hollow bore 42 formed in the fuel supply body 5, while the larger-diameter portion 25 of the pressure intensifying piston 9 reciprocates in the hollow bore 26 formed in the injector body 4. A sealing member 44 is disposed in the hollow bore 26 formed in the injector body 4, and the clearance between the pressure intensifying piston 9 and the hollow bore 26 is sealed by the sealing member 44 to isolate the spring chamber 30 and the pressure chamber 8 from each other so that the high-pressure working oil in the pressure chamber 8 does not leak into the spring chamber 30. Incidentally, although FIG. 10 illustrates the smaller-diameter portion 24 and the larger-diameter portion 25 as an integral structure, they can also be constructed as separate parts.

The pressure intensifying chamber 7 is formed in the hollow bore 42 formed in the fuel supply body 5. The fuel is supplied to the pressure intensifying chamber 7 from the fuel chamber 20 through a fuel passage 37 formed in the hollow spacer body 21 and through a fuel passage 35 formed in the spacer body 81. A check valve 36 is incorporated in the fuel passage 35 so that the high-pressure fuel in the pressure intensifying chamber 7 is prevented from flowing back to the fuel chamber 20. The fuel pressure-intensified in the pressure intensifying chamber 7 is supplied to the injection hole 13 through the fuel passage 22. A fuel passage is formed between the nozzle body 2 and the needle valve 23, and when a high fuel pressure is applied to tapered faces 45 and 45a formed on the needle valve 23, the needle valve 23 is lifted in the hollow hole 46 and opens the injection hole 13.

A seat face 72 on which the pressure intensifying piston 9 is to be seated at its restoration position is formed on a wall surface of the injector body 4 in parallel with and in opposition to the top face 73 of the pressure intensifying piston 9. The seat face 72 and the top face 73 of the pressure intensifying piston 9 forms the pressure chamber 8. In the pressure chamber 8, a clearance 74 is formed between the top face 73 of the pressure intensifying piston 9 and the seat face 72, and when the high-pressure working oil penetrates into the clearance 74, the clearance 74 is enlarged in vertical width with the downward movement of the pressure intensifying piston 9.

A space equivalent to the stroke of the pressure intensifying piston 9 is formed in the spring chamber 30, and fuel is stored in the space. If fuel penetrates into the spring chamber 30 to such an extent that the space in the spring chamber 30 becomes equal to or less than the stroke of the pressure intensifying piston 9, the fuel which exists in the spring chamber 30 in the hollow bore 26 is discharged into the fuel chamber 20 through the discharge passage 83 with the reciprocating motion of the pressure intensifying piston 9. Since the check valve 84 is disposed in the discharge passage 83, the fuel does not flow from the fuel chamber 20 back to the spring chamber 30 through the discharge passage 83.

In the injector 1, the opening and closing operation of the injection hole 13 by the needle valve 23 is performed under the control of the solenoid 10, and if the solenoid 10 is excited by a command from the controller 50, an armature 32 is attracted to the solenoid 10 and the solenoid valve 16 fixed to the armature 32 lifts against the spring force of the return spring 19. When the solenoid valve 16 lifts, a passage 33, which is formed between a tapered face 86 of the solenoid valve 16 and a valve seat 87 of the injector body 4, is opened and the high-pressure working oil is supplied from the high-pressure oil manifold 56 to the pressure chamber 8 through a supply passage 31 and a passage 34 which are formed in the injector body 4, thereby urging the pressure intensifying piston 9 in a pressure intensifying direction. In the meantime, the fuel of the common rail 51 is supplied to the fuel chamber 20 from the supply port 11 formed in the case 6, and is then supplied from the fuel chamber 20 to the pressure intensifying chamber 7 through the fuel passage 37 formed in the hollow spacer body 21 and through the fuel passage 35 formed in the spacer body 81.

When the pressure intensifying piston 9 moves down by the pressure action of the working oil in the pressure chamber 8, the fuel passage 35 is closed by the check valve 36 and the fuel in the pressure intensifying chamber 7 is pressure-intensified. When the fuel in the pressure intensifying chamber 7 is pressure-intensified, the fuel pressure lifts the needle valve 23 against the spring force of the return spring 18 and the fuel is injected from the opened injection hole 13. If the urging force applied to the solenoid valve 16 by the solenoid 10 is released, the solenoid valve 16 moves down by the spring force of the return spring 19, and the drain groove 39 provided on the solenoid valve 16 is opened so that the high-pressure working oil in the pressure chamber 8 is discharged through the drain groove 39 and the drain passage 38. When the high-pressure working oil in the pressure chamber 8 is discharged, the pressure intensifying piston 9 is restored to its original position by the return spring 17 and the pressure intensifying chamber 7 becomes equal in pressure to the fuel chamber 20 so that the fuel pressure applied to the needle valve 23 lowers and the tapered face 45 of the needle valve 23 is seated on the valve seat of the nozzle body 2 by the spring force of the return spring 18, to close the injection hole 13.

Another type of accumulator fuel injection system is a system which uses pressurized fuel itself as working fluid, and controls the lift of a needle valve by controlling the fuel pressure in a balance chamber and injects high-pressure fuel into a combustion chamber from an injector. This type of accumulator fuel injection system and injectors used in this system will be described with reference to FIGS. 11 and 12. In the accumulator fuel injection system shown in FIG. 11, high-pressure fuel is stored in a common rail 102 which serves as an accumulator, and is supplied from the common rail 102 to a plurality of injectors 101 through branch pipes 103 which constitute part of a fuel flow passage and is injected into individual combustion chambers of an engine from the respective injectors 101. The supply of fuel to the common rail 102 is effected by supplying fuel from a fuel tank 104 to a feed pump 106 through an oil filter 105 and feeding the fuel through a feed pipe 107 to a fuel pump 108 which is, for example, a plunger type of variable displacement high-pressure pump. The fuel pump 108 is driven by the engine, and increases the pressure of the fuel to a required predetermined pressure and supplies the fuel to the common rail 102 through a fuel pipe 109. The fuel pump 108 also maintains the fuel pressure in the common rail 102 at a predetermined pressure. The fuel released from the fuel pump 108 is returned to the fuel tank 104 through a return pipe 110. The fuel which has been supplied to the injectors 101 from the respective branch pipes 103 but has not been consumed for injection into the combustion chambers is returned to the fuel tank 104 through a return pipe 111.

Signals from a sensor group 114 are inputted to a controller 112 which is an electronic control unit. The sensor group 114 includes various sensors for detecting operating states of the engine, such as an engine speed sensor for detecting an engine speed Ne, an engine cylinder determining sensor, a top dead center (TDC) detecting sensor, an accelerator depression quantity sensor for detecting a depression quantity Acc of an accelerator pedal, a cooling water temperature sensor for detecting a cooling water temperature Tw, an atmospheric temperature sensor for detecting an atmospheric temperature Ta, an atmospheric pressure sensor for detecting an atmospheric pressure Pa, and an intake pipe pressure sensor for detecting an intake pipe pressure Pb. The controller 112 controls the conditions of injection of fuel by the injectors 101, that is, the injection timing and the injection quantity of fuel, on the basis of such signals so that the output of the engine becomes an optimum one matching the operating states of the engine. A pressure sensor 113 is provided on the common rail 102, and a detection signal of the fuel pressure in the common rail 102 detected by the pressure sensor 113 is sent to the controller 112. When the injectors 101 inject the fuel, the fuel in the common rail 102 is consumed to reduce a fuel pressure in the common rail 102, and the controller 112 controls the discharge pressure of the fuel pump 108 so that the fuel pressure in the common rail 102 is kept constant.

Each of the injectors 101 used in this accumulator fuel injection system has the structure shown in FIG. 12 in cross section. A branch pipe 103 is connected to an upper side portion of the injector 101 via a fuel inlet joint 120. Fuel passages 121 and 122 are formed in the body of the injector 101, and the branch pipe 103 and the fuel passages 121 and 122 constitute a fuel flow passage. The fuel supplied through the fuel flow passage is injected into the corresponding combustion chamber from an injection hole 125 which opens when a needle valve 124 is lifted, through a fuel reservoir 123 and a passage around the needle valve 124.

The injector 101 is provided with a balance chamber type of needle valve lifting mechanism for controlling the lift of the needle valve 124. Specifically, a solenoid valve 126 which serves as a control valve is provided in an uppermost portion of the injector 101, and a control current supplied from the controller 112 as a control signal is sent to a solenoid 128 of the solenoid valve 126 through a signal line 127. When the solenoid 128 is excited, the armature 129 moves upwardly to open an opening/closing valve 132 provided at an end of a fuel passage 131, so that the fuel pressure of the fuel supplied to a balance chamber 130 from the fuel flow passage is released through the fuel passage 131. A control piston 134 is disposed for upward and downward movement in a hollow hole 133 formed in the body of the injector 101. A force which presses the control piston 134 downwardly on the basis of a fuel pressure acting on a tapered face 136 which faces the fuel reservoir 123 is greater than a downward pressure which acts on the control piston 134 by a force based on a reduced pressure in the balance chamber 130 and the spring force of a return spring 135, so that the control piston 134 moves upwardly. Accordingly, the lift of the needle valve 124 is allowed and the fuel is injected from the injection hole 125. A fuel injection quantity is determined by the fuel pressure in the fuel flow passage and the lift (lift quantity and lift interval) of the needle valve 124, while the lift of the needle valve 124 is determined by an injection pulse which is sent as a control current to the solenoid 128 for the purpose of controlling the opening and closing of the opening/closing valve 132.

In general, regarding a fuel injection quantity Q of each of the injectors 1 or 101 and a command pulse width PW supplied from the controller 50 or 112 to each of the solenoid valves 16 or the solenoid valves 126, if the pressure of the working oil in the high-pressure oil manifold 56 or the pressure of the fuel in the common rail 102, that is, working fluid pressure, is constant, the fuel injection quantity Q becomes larger as the command pulse width PW becomes larger. In addition, even in the case of the same command pulse width PW, as the working fluid pressure becomes larger, the fuel injection quantity Q becomes larger. Since a fuel injection is started or stopped with a predetermined time delay with respect to the rise time instant and the fall time instant of a command pulse, it is possible to control injection timing by controlling a time instant at which to turn on or off the command pulse.

A fuel injection quantity which is a target quantity to be injected per combustion cycle is calculated on the basis of a basic injection quantity characteristic map. Specifically, the relation between the engine speed Ne and a target injection quantity Qt is previously obtained as a basic characteristic of the engine, by using the accelerator depression quantity Acc as a parameter. Accordingly, the target injection quantity Qt can be obtained on the basis of this map from the engine speed Ne and the accelerator depression quantity Acc which are obtained at each specified moment.

The outline of control of a conventional accumulator fuel injection is shown in a flowchart of FIG. 4. In this control flowchart, first, the target injection quantity Qt is obtained from the engine speed Ne and the accelerator depression quantity Acc both of which are obtained at the present time (S81). In the meantime, a pressure Pr of the accumulator is detected by the pressure sensor 71 or the pressure sensor 113 provided on the high-pressure oil manifold 56 or the common rail 102 which serves as the accumulator, and timing at which to read in the detected accumulator pressure Pr is determined (S82), and the accumulator pressure Pr for calculation of the pulse width PW of a command pulse to be supplied to the solenoid valve of each of the injectors is calculated from the detected value read in at that timing (S83). The pulse width PW of a command pulse to be supplied to the solenoid of each of the injectors is calculated from a predetermined map on the basis of the target injection quantity Qt obtained at S81, the accumulator pressure calculated at S83, and information about operating states of the engine which has been obtained from other sensors (S84). Each of the injectors is driven on the basis of the pulse width PW of the command pulse calculated at S84 (S87), a cylinder decision for determining a cylinder into which to inject fuel (S85), and the determination of the fuel injection timing which has been made on the basis of the accelerator depression quantity Acc and information about operating states of the engine which has been obtained from other sensors (S86). Incidentally, the timing at which to read in the accumulator pressure is determined at S82 on the basis of the fuel injection timing determined at S86.

As is empirically known, in an accumulator fuel injection system which uses fuel itself as working fluid and employs a balance chamber, the pressure of a common rail which is an accumulator pressure undergoes a pulsation due to feeding of a high-pressure fuel by a fuel supply pump, a pressure decrease during injection, a water hammer due to the closing of a valve at the time of the end of injection, or the like, but even during the pulsation, the pressure of the common rail at the rise time point of a command pulse for a fuel injection valve becomes approximately equal to actual injection pressure. By making use of this fact, it has been proposed to sample the pressure of the common rail at the rise time point of a command pulse and determine a fuel injection quantity (refer to Japanese Patent Laid-Open No. 125985/1993).

In addition, if the fuel injection timing and the fuel injection quantity are to be accurately controlled, it is necessary to accurately control the working fluid pressure. To this end, there has been provided a pressure intensifying type of fuel injection apparatus which is arranged to detect the pressure of working oil which is supplied to injectors as working fluid by means of a sensor, generate a pressure indication signal indicative of the pressure detected by the sensor, electronically controls the pressure of the working oil supplied to the injectors according to the value of a parameter, such as engine speed, indicative of at least one operating state of an engine, and correct the pressure of the working oil according to the pressure indication signal (refer to Japanese Patent Laid-Open No. 511527/1994). The pressure of the working oil is detected by detecting an actual pressure of an oil manifold by sampling at intervals of such a period that a mean pressure is detected so that excessively sensitive detection is prevented during a transient status. The output of the sensor is sent to an electronic control module, in which the actual pressure of the working oil is compared with a desired ideal set value and a required correction is applied to an output control signal.

Further, it is known to incorporate an electronic control device for an injector type accumulator fuel injection system in a pressure intensifying type of fuel injection apparatus which performs feedback control of the discharge pressure of a hydraulic pump by means of a control valve so that the oil pressure of working oil to be supplied to each injector for the purpose of controlling injection of fuel from each injector is made coincident with a target oil pressure to be obtained according to the operating states of an engine. The electronic control device sets sampling time for detecting an actual oil pressure in a common passage leading to each injector to a time point synchronized with the rise of a common pulse to each injector, and recalculates injection duration, that is, a command pulse width, on the basis of an oil pressure detected by sampling (Japanese Patent Laid-Open No. 12027/1995). This control device is intended to specify the sampling time and obtain an approximate value of a pressure at which to carry out actual injection, even if it is impossible to accurately reproduce the oil pressure while following a transient variation in the oil pressure of the working oil to be supplied to each injector.

However, if the obtained pressure of an accumulator is not an accurate pressure of the accumulator, the pulse width PW obtained from a map is not always equal to a truly necessary pulse width. In addition, although a flow control valve for controlling accumulator pressure (for example, the flow control valve 64 shown in FIG. 9) is controlled by an electronic control unit, there is a factor which makes it difficult to accurately control the pressure of the accumulator, such as a response delay of the flow control valve or a response delay of the whole of a hydraulic circuit or a fuel circuit. It is also known that a sharp pressure variation occurs in the pressure of the working fluid owing to fuel injection, and the flow control valve is incapable of controlling the pressure of the working fluid according to this sharp pressure variation. In other words, as is apparent from the control of accumulator pressure in the matter disclosed in Japanese Patent Laid-Open No. 511527/1994, the flow control valve does not controls moment-to-moment accumulator pressures but merely controls a time-average accumulator pressure.

As shown in FIG. 5, the accumulator pressure repeatedly varies each time fuel injection is executed. Specifically, even if the operating state of the engine is constant, the accumulator pressure Pr varies with respect to a mean accumulator pressure Prm. The electronic control unit controls the mean accumulator pressure Prm. Specifically, when fuel injection is executed at time $T_n$ (n=. . . n–1, n–2, n, n+1, . . . ), the pressure of the accumulator is consumed and the accumulator pressure Pr starts to fall as indicated by an arrow D at each injection time, and when fuel injection comes to an end, the accumulator pressure starts to recover as indicated by an arrow U, thus repeating the above variation.

An actual injection quantity Qa is physically determined not by the time-average accumulator pressure Prm but by an accumulator pressure Pri at the starting time of fuel injection. Accordingly, calculation of the pulse width PW of a command pulse to be supplied to the solenoid valve provided in each injector for causing each injector to execute fuel injection needs to be performed by using the accumulator pressure Pri at the present time, but, actually, the electronic control unit needs a computing time duration and cannot obtain a calculation result before actual fuel injection. In the matter disclosed in Japanese Patent Laid-Open No. 12027/1995, it is proposed to execute this calculation during an injection delay period, as described above, but it is impossible to realize such a high-speed computation at least by using a CPU which is available at an affordable cost.

Regarding how to obtain an accumulator pressure actually required to execute fuel injection, the following two methods have heretofore been known. The first method is a method in which, as shown in FIG. 5, the accumulator pressure $Pri(T_n)$ at the present fuel injection starting time ($T_n$) or a moving average value of the accumulator pressures obtained at a plurality of fuel injection starting times up to the present fuel injection starting time ( . . . , $T_{n-4}$ to $T_n$) is used as accumulator pressure at the next fuel injection timing, that is, the next fuel injection starting time ($T_{n+1}$).

The second method is a method, as shown in FIG. 6, samples the accumulator pressure Pr at a constant sampling period Ts independently of fuel injection and uses, as the accumulator pressure Pri ($T_{n+1}$) at the next fuel injection starting time ($T_{n+1}$), a sampled value Pjbs immediately previous to fuel injection, or a moving average value Pjbma immediately previous to fuel injection from among moving average values Pma obtained from a plurality of sampled values. If the operating state of the engine is a steady state, an offset quantity DP between actual accumulator pressure and moving average pressure is constant, and if an offset quantity is set in advance, an actual accumulator pressure can be obtained.

In the above-described conventional method which uses as the accumulator pressure the immediately previous sampled value Pjbs or the immediately previous moving average value Pjbma of the sampled values of accumulator pressure, the pressure used can be used as an approximate value of an actual accumulator pressure under conditions in which a variation in accumulator pressure caused by the execution of fuel injection is stable. However, under conditions in which the accumulator pressure transiently varies for reasons such as a variation in the rotating speed of the engine and a large variation in target fuel injection quantity, the sampled value Pjbs or the moving average value Pjbma greatly differs from the actual accumulator pressure, so that it is not preferable to use either value as the approximate value of the actual accumulator pressure.

In the method, shown in FIG. 5, which uses the accumulator pressure Pri ($T_n$) at the present fuel injection starting time $T_n$ as a predicted value of accumulator pressure at the next fuel injection starting time $T_{n+1}$, during a transient state in which the accumulator pressure gradually rises as shown in FIG. 7, the predicted value becomes lower by an amount equivalent to an offset quantity ΔP1 than an actual accumulator pressure at the next fuel injection. Even in the method which uses a moving average value Pima (refer to FIG. 7) of the accumulator pressures Pri obtained at a plurality of fuel injection starting times up to the time $T_n$, as a predicted value of accumulator pressure at the next fuel injection starting time $T_{n+1}$, during a transient state in which the accumulator pressure gradually rises as shown in FIG. 7, the moving average value Pima becomes lower by an amount equivalent to an offset quantity ΔP2 than an actual accumulator pressure at the next fuel injection. If the command pulse width PW is calculated on the basis of an accumulator pressure which is lower than the actual accumulator pressure, the calculated value becomes longer than a command pulse width PW to be obtained for the actual accumulator pressure, and the resultant fuel injection quantity becomes excessively large.

Even in the method, shown in FIG. 6, which uses the immediately previous moving average value Pjbma from among the moving average values Pma of accumulator pressure sampled at a constant sampling period Ts, as a predicted value of accumulator pressure at the time $T_{n+1}$, during a transient state in which the accumulator pressure gradually rises as shown in FIG. 8, the moving average value Pjbma becomes lower by an amount equivalent to an offset quantity ΔP3, similarly to the case shown in FIG. 7, than an actual accumulator pressure Pri ($T_{n+1}$) at the next fuel injection starting time. In this case as well, the calculated command pulse width PW becomes longer than a command pulse width PW to be obtained for the actual accumulator pressure, and the resultant fuel injection quantity becomes excessively large. In other words, either method is not preferable in terms of engine control in that the difference between the actual injection quantity Qa and the target injection quantity Qt becomes large and the degree of cleanness of exhaust gas lowers and drivability (acceleration feeling) or fuel consumption becomes inferior.

In addition, the method which uses, instead of a moving average value, an immediately previous sampled value can reduce a delay due to a transient state, but is susceptible to noise. Specifically, actually, accumulator pressure varies irregularly and far more finely, so that a pressure at a sampling time point occasionally shows an abnormal value which greatly deviates from a proper mean pressure value. If the command pulse width PW is calculated on the basis of this abnormal value, the obtained value differs from an actually necessary pulse width and is still not preferable in terms of engine control.

Therefore, the fuel injection of the accumulator type of engine has a problem to be solved, in that it is necessary to accurately predict an actual accumulator pressure at fuel injection time, and execute fuel injection on the basis of the accurately predicted accumulator pressure, even if accumulator pressure is in a transient state owing to a factor such as a variation in the operating state of the engine.

An object of this invention is to solve the above-described problem and to provide a fuel injection methodand apparatus for an engine both of which, because a detected accumulator pressure may be noise and not acceptable, obtains an approximate function of accumulator pressure on the basis of a previously detected accumulator pressure and predicts an accumulator pressure at injection time, by using the approximate function, thereby highly accurately predicting the accumulator pressure irrespective of the operating state of the engine.

DISCLOSURE OF INVENTION

This invention relates to a fuel injection method for an engine fuel injection system in which a working fluid fed out by a pump is stored in an accumulator, a target injection characteristic is set on the basis of detection signals from sensors for detecting an operating state of the engine, lifts of needle valves provided in bodies of the respective injectors are controlled by using a pressure of the working fluid introduced into injectors from the accumulator by control valves, and fuel is injected into combustion chambers of the engine from injection holes formed in the respective bodies and opened by the respective needle valves in accordance with the target injection characteristic, characterized by detecting the pressure of the working fluid in the accumulator at a predetermined sampling period, obtaining an approximate function of the pressure of the working fluid in the accumulator on the basis of data on the pressure of the working fluid, obtaining from the approximate function a set value of the pressure of the working fluid at an injection starting time of the next fuel injection, and controlling the control valves on the basis of the set value of the pressure of the working fluid.

This invention relates to a fuel injection apparatus for an engine comprising, an accumulator for storing a working fluid fed out by a pump, injectors having bodies in which injection holes for injecting fuel into combustion chambers of the engine are respectively formed and in which needle valves for opening and closing the respective injection holes are respectively accommodated, sensors for detecting operating states of the engine, control valves provided in said respective injectors for controlling supply and discharge of the working fluid so as to use a pressure of the working fluid supplied from said accumulator, and a controller for setting a target injection characteristic on the basis of detection signals from said sensors and for driving said control valves to control lifts of said respective needle valves on the basis of the pressure of the working fluid so as to execute fuel injection according to the target injection characteristic, wherein said controller obtains an approximate function of the pressure of the working fluid in said accumulator on the basis of detected data on the pressure of the working fluid at a determined sampling period, obtains a set value of the pressure of the working fluid at an injection starting time of the next fuel injection from the approximate function, and controls said control valves on the basis of the set value.

Since the fuel injection method and apparatus for an engine according to the present invention have the above-described arrangements, respectively, fuel injection is performed in the following manner: detecting the pressure of the working fluid in the accumulator at a predetermined sampling period; obtaining an approximate function of the pressure of the working fluid in the accumulator on the basis of data on the pressures of the working fluid; obtaining from the approximate function a set value of the pressure of the working fluid at an injection starting time of the next fuel injection; and controlling the control valves on the basis of the set value of the pressure of the working fluid. Accordingly, even immediately before injection, instead of a value which is calculated from a measured value which may contain noise, a value which is calculated from the previously obtained approximate function with a sufficient temporal margin is used as the accumulator pressure at the injection starting time of the next fuel injection, and the accumulator pressure at fuel injection time is highly accurately predicted for all operating states of the engine and fuel injection according to a target injection characteristic is executed on the basis of the predicted value.

Each of the above-described fuel injection method and apparatus for an engine is characterized by updating the approximate function for each sampling of the pressure of the working fluid in the accumulator, obtaining a predicted value of the pressure of the working fluid at the next sampling time from the updated approximate function, comparing a predetermined threshold with an absolute value of a deviation between the predicted value and a detected value of the pressure of the working fluid detected at the next sampling time, and, if the absolute value is not greater than the threshold, reading in the detected value of the pressure of the working fluid and updating the data, or, if the absolute value exceeds the threshold, reading in the predicted value and updating the data, the approximate function being updated on the basis of the data updated. Since updating of the approximate function is performed in the above-described manner, if it is determined that the accumulator pressure read in during each sampling is an abnormal value, the measured value is not used as data to be used for the updating of the approximate function, and an accumulator pressure predicted from accumulator pressures obtained by previous sampling is regarded as the current accumulator pressure so that the approximate function of the accumulator pressure is obtained. Accordingly, since an approximate function having a large error is not obtained on the basis of the abnormal value, an accumulator pressure at injection time is predicted highly accurately.

In each of the above-described fuel injection method and apparatus for an engine, the sampling period is a constant time period or a constant crank angle period. The sampling period is determined separately from the fuel injection time. Since it is necessary to finally convert injection time into time relative to a crank angle even if the sampling period is a constant time period, it is preferable that the sampling period be made a constant crank angle.

In the above-described fuel injection method and apparatus for an engine, the working fluid is a working oil and the control valves are changeover valves which change over between supply and discharge of the working fluid to and from pressure chambers which are formed in the bodies of the respective injectors and to which ends of the pressure intensifying pistons are exposed, so as to drive the pressure intensifying pistons for intensifying a pressure of the fuel. In other words, the fuel injection method and apparatus according to this invention are applied to an accumulator fuel injection system in which pressure intensifying pistons are used as injectors and, instead of fuel, high-pressure working oil is used as working fluid.

In the above-described fuel injection method and apparatus, the working fluid may be a working fuel and the control valves are opening/closing valves which control discharge of the fuel from balance chambers so as to control a pressure of the fuel supplied to the balance chambers which are formed in the bodies of the respective injectors and to which are exposed ends of control pistons for controlling the respective needle valves. In other words, the fuel injection method and apparatus according to this invention are applied to an accumulator fuel injection system in which fuel is used as working fluid and balance chambers are formed in the respective injectors.

In the above-described fuel injection method and apparatus, the target injection characteristic is the injection starting time and a fuel injection quantity at the next fuel injection and driving time durations for the respective control valves are controlled on the basis of the fuel injection quantity and the set value of the pressure of the working fluid obtained at the injection starting time. The fuel injection characteristic of an engine is basically determined by injection starting time and fuel injection quantity. If injection starting time is obtained from a map on the basis of, for example, engine speed or target injection quantity, a predicted value of accumulator pressure at the injection starting time is obtained from the injection starting time and an approximate function of accumulator pressure separately from a prediction of approximate function by sampling, whereby an accumulator pressure is set. If a target fuel injection quantity is determined, the intensity of injection based on an accumulator pressure at injection starting time, that is, an injection rate, is obtained, whereby the time duration over which to inject fuel, that is, fuel injection time duration, is determined.

In the above-described fuel injection method and apparatus, the control valves are solenoid valves provided with solenoids excited by command pulses having pulse widths corresponding to the respective driving timing. Target command pulse output time durations are obtained according to target injection starting time for the injectors, for example, by a map on the basis of engine speed or target injection quantity. In the solenoid valves, the fuel injection time duration corresponds to the pulse width of a command pulse for opening each of the solenoid valves. Accordingly, the command pulse width is calculated according to a target total injection quantity.

BEST MODE FOR CARRYING OUT THE INVENTION

An embodiment of a fuel injection method and apparatus for an engine according to this invention will be described below with reference to the accompanying drawings. Incidentally, a common rail fuel injection system to which a fuel injection apparatus for an engine according to this invention is applied and an injector for use in such system may be either of the two conventional known types of systems and injectors which have been described previously with reference to FIGS. 9 to 12.

Sensors for detecting the operating states of the engine include at least the following examples.

(1) Engine Speed Sensor

The engine speed sensor includes a gear plate having a predetermined number of teeth (for example, 36 teeth) and a pickup sensor, both of which are secured to a crankshaft, and calculates the present engine speed Ne from the time duration required to input pulses for a constant number of teeth (for example, 18 teeth).

(2) Cylinder Determining Sensor

The cylinder determining sensor detects a reference signal required for a controller to determine a cylinder to be controlled, and includes a pickup sensor and a gear plate having a tooth (one tooth) corresponding to a particular crank angle (for example, TDC) of a particular cylinder (for example, the first cylinder). The pickup sensor and the gear plate are secured to a camshaft of a high-pressure fuel pump or a camshaft for driving intake and exhaust valves.

(3) Accelerator Depression Quantity Sensor

The accelerator depression quantity sensor detects a depression quantity Acc of an accelerator pedal.

(4) Accumulator Pressure Sensor

The accumulator pressure sensor detects the pressure of an accumulator at a high-pressure manifold or a common rail.

Figure 1:
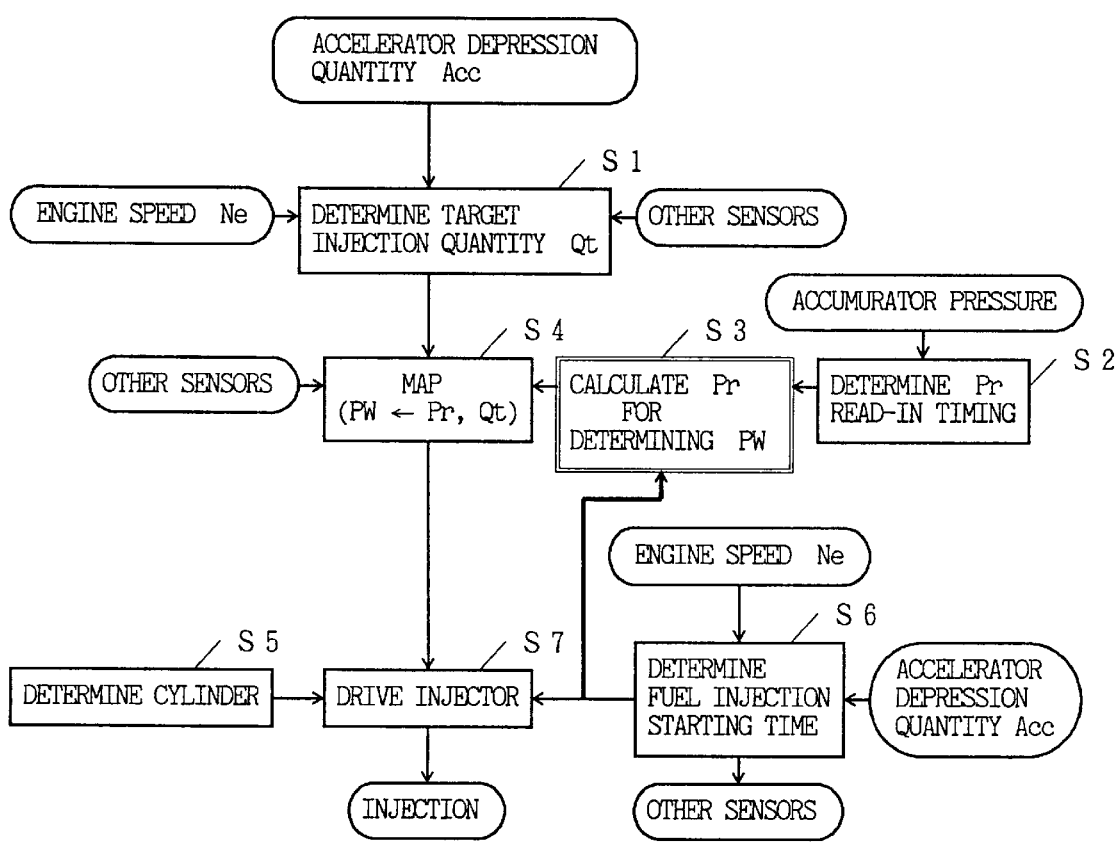
FIG. 1 is a view showing a basic control flowchart from the operating state of an engine to driving of injectors in fuel injection control of the engine according to this invention.
Figure 4:
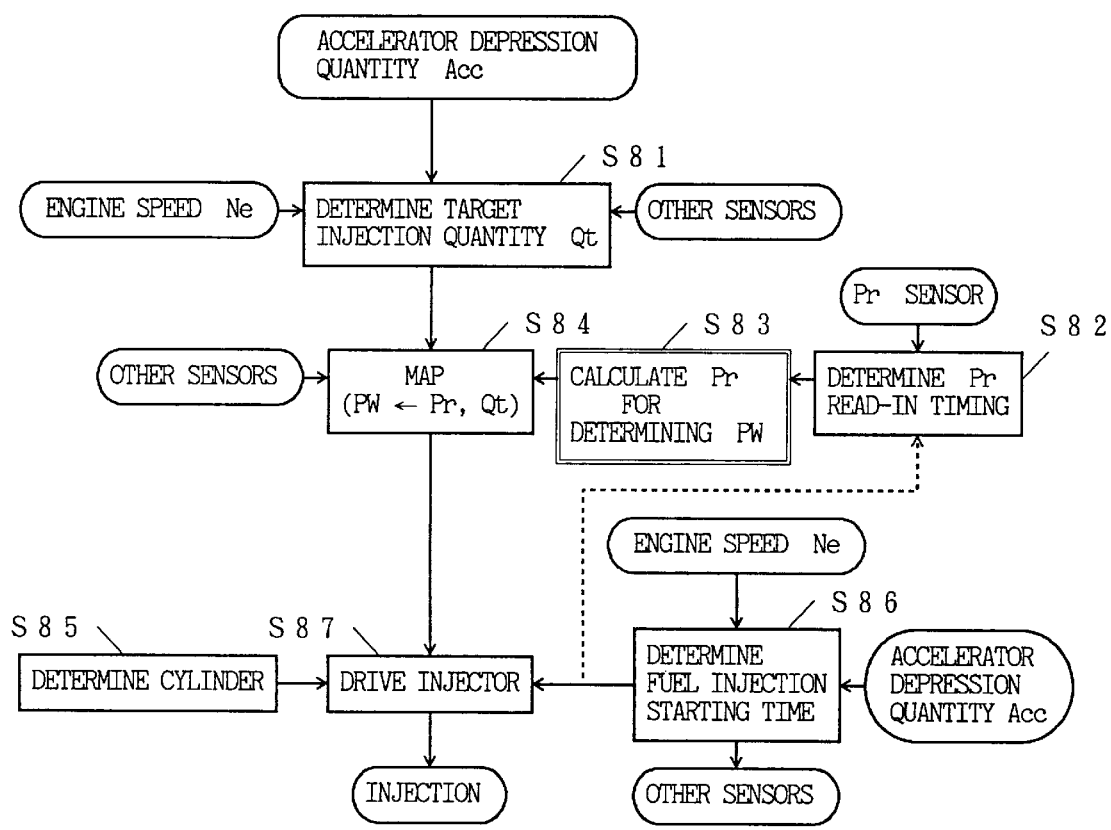
FIG. 4 is a view showing a basic control flowchart from the operating state of an engine to driving of injectors in conventional fuel injection control of the engine.
Figure 5:
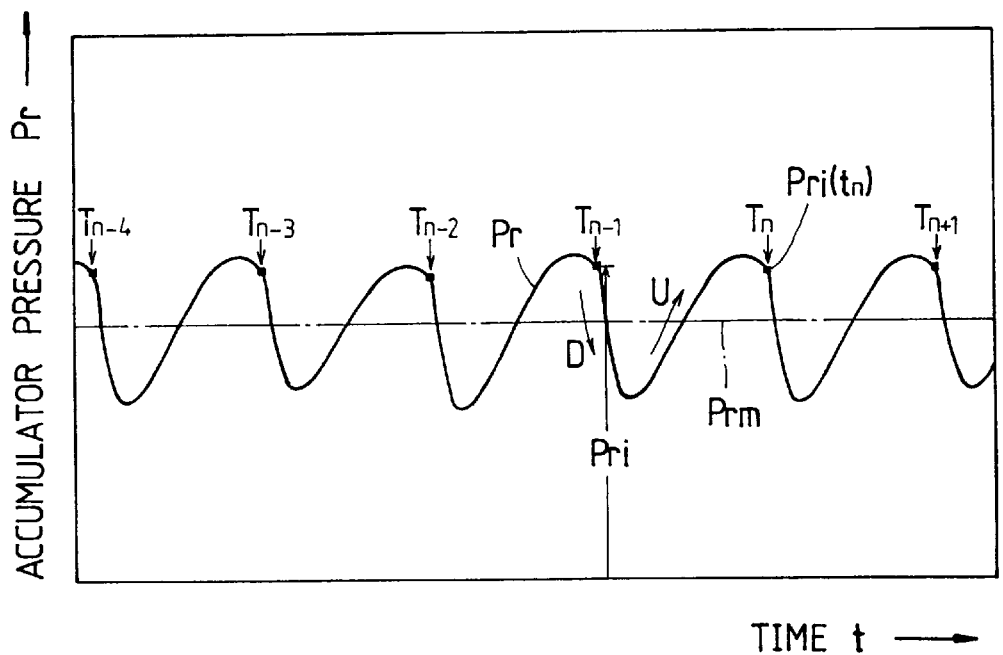
FIG. 5 is a graph showing a variation with time in accumulator pressure during the steady operating state of the engine and showing an example in which detection of accumulator pressure is executed at injection time.
Figure 6:
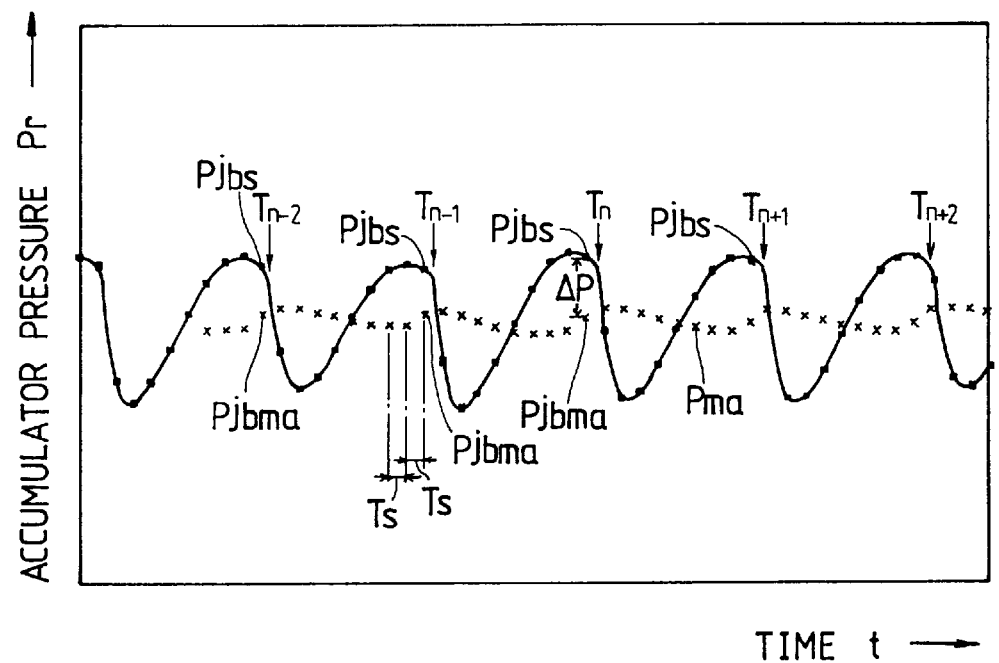
FIG. 6 is a graph showing a variation with time in accumulator pressure during the steady operating state of the engine and showing an example in which detection of accumulator pressure is executed at a constant sampling period, as well as a variation with time in a moving average of detected values.
Figure 7:
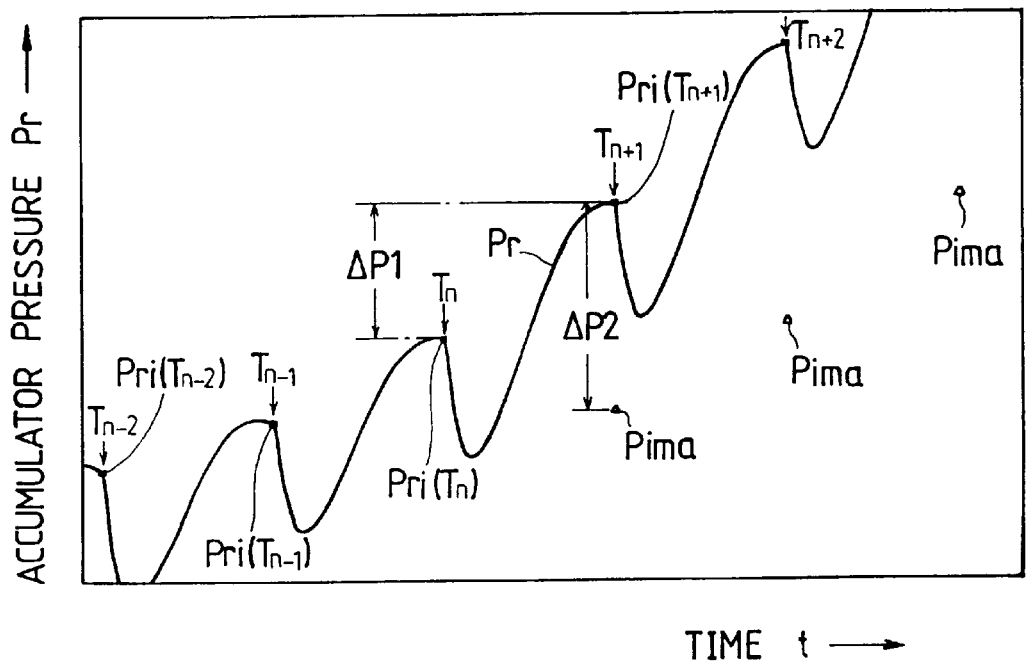
FIG. 7 is a graph showing a variation with time in accumulator pressure during the transient operating state of the engine and showing an example in which detection of accumulator pressure is executed at injection time.
Figure 8:
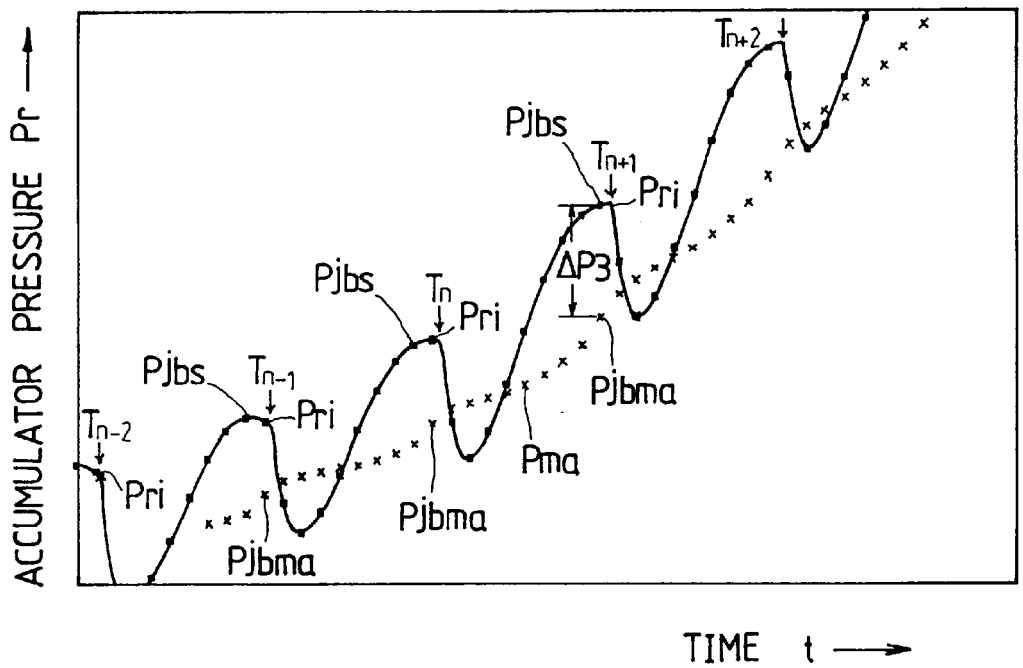
FIG. 8 is a graph showing a variation with time in accumulator pressure during the transient operating state of the engine and showing an example in which detection of accumulator pressure is executed at a constant sampling period, as well as a variation with time in a moving average of detected values.
Figure 9:
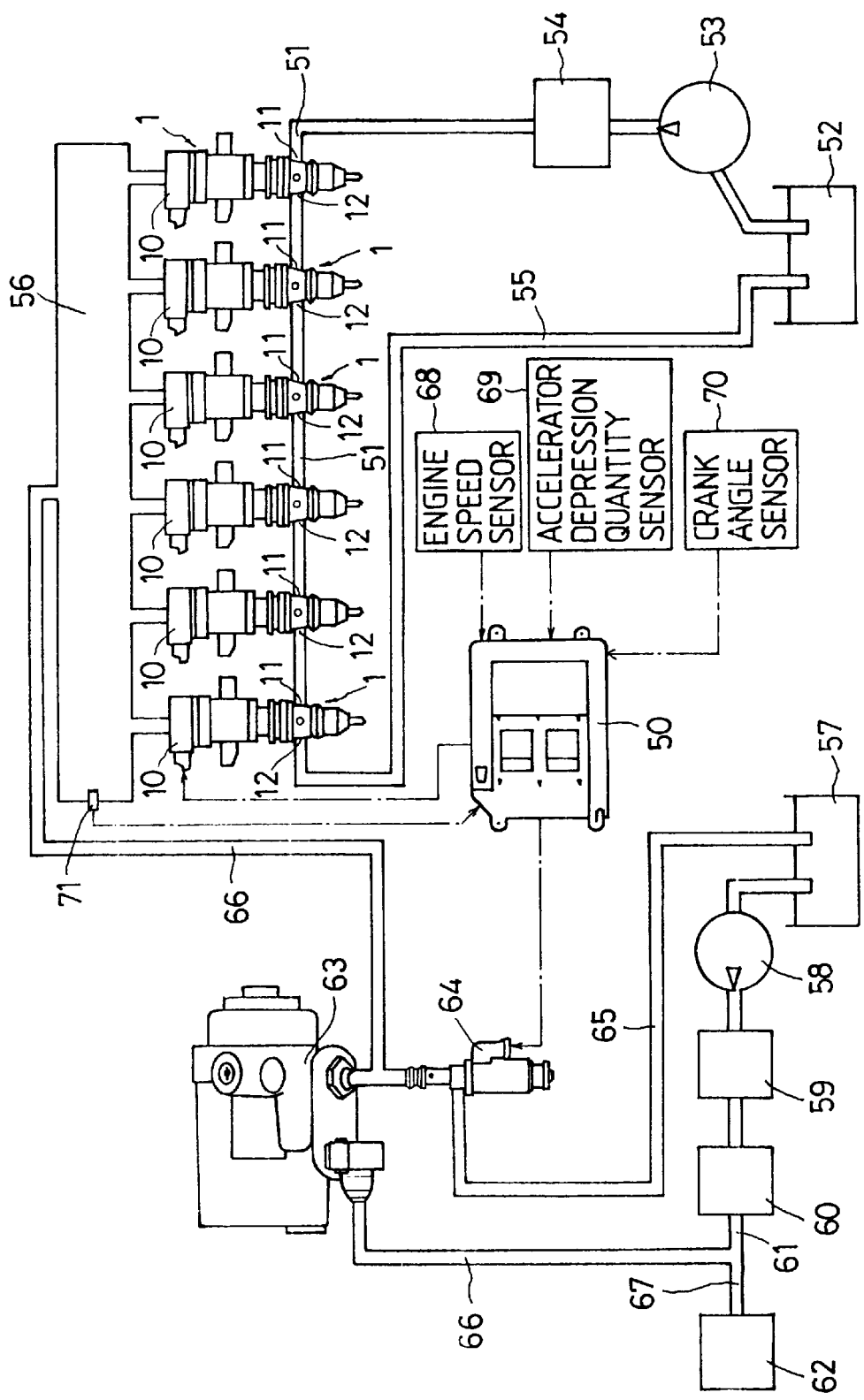
FIG. 9 is a diagrammatic view showing an accumulator fuel injection system which uses high-pressure working oil as its working fluid.
Figure 10:
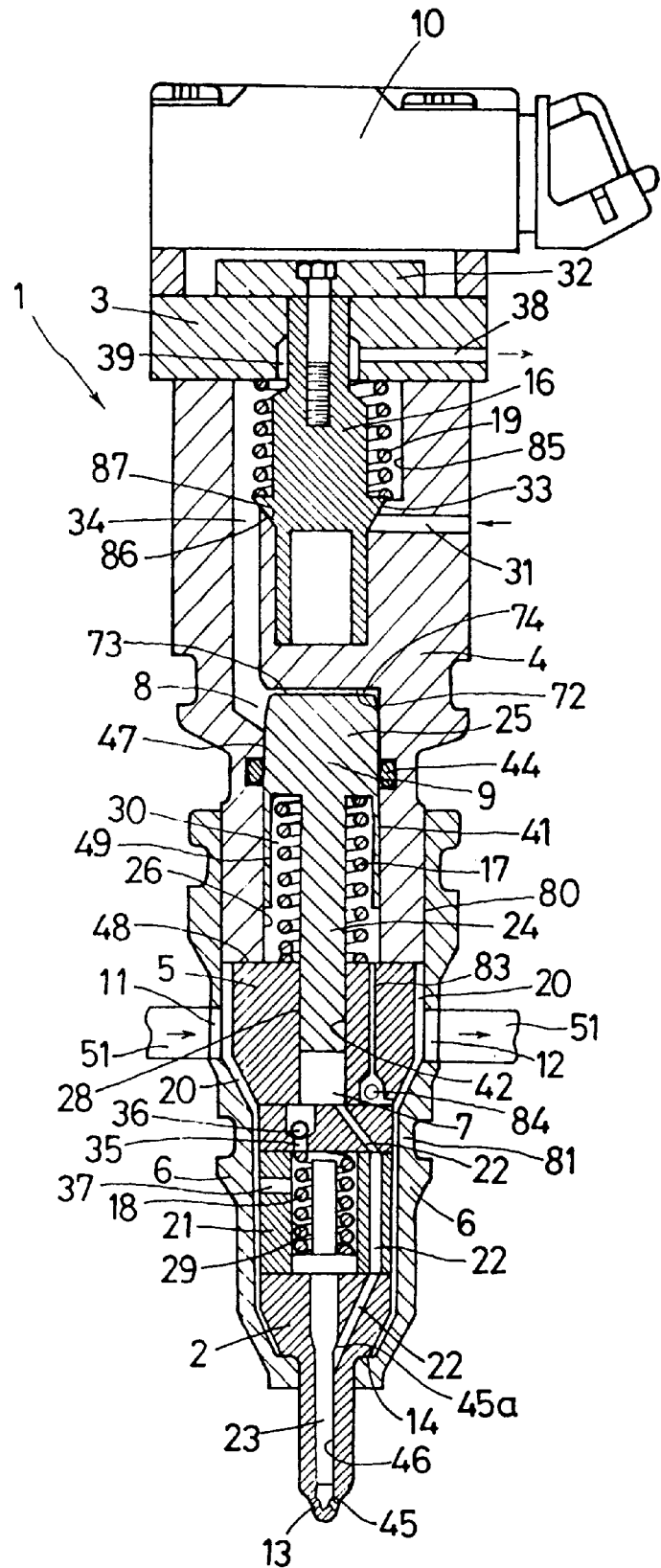
FIG. 10 is a cross-sectional view of an injector used in the accumulator fuel injection system shown in FIG. 9.
Figure 11:
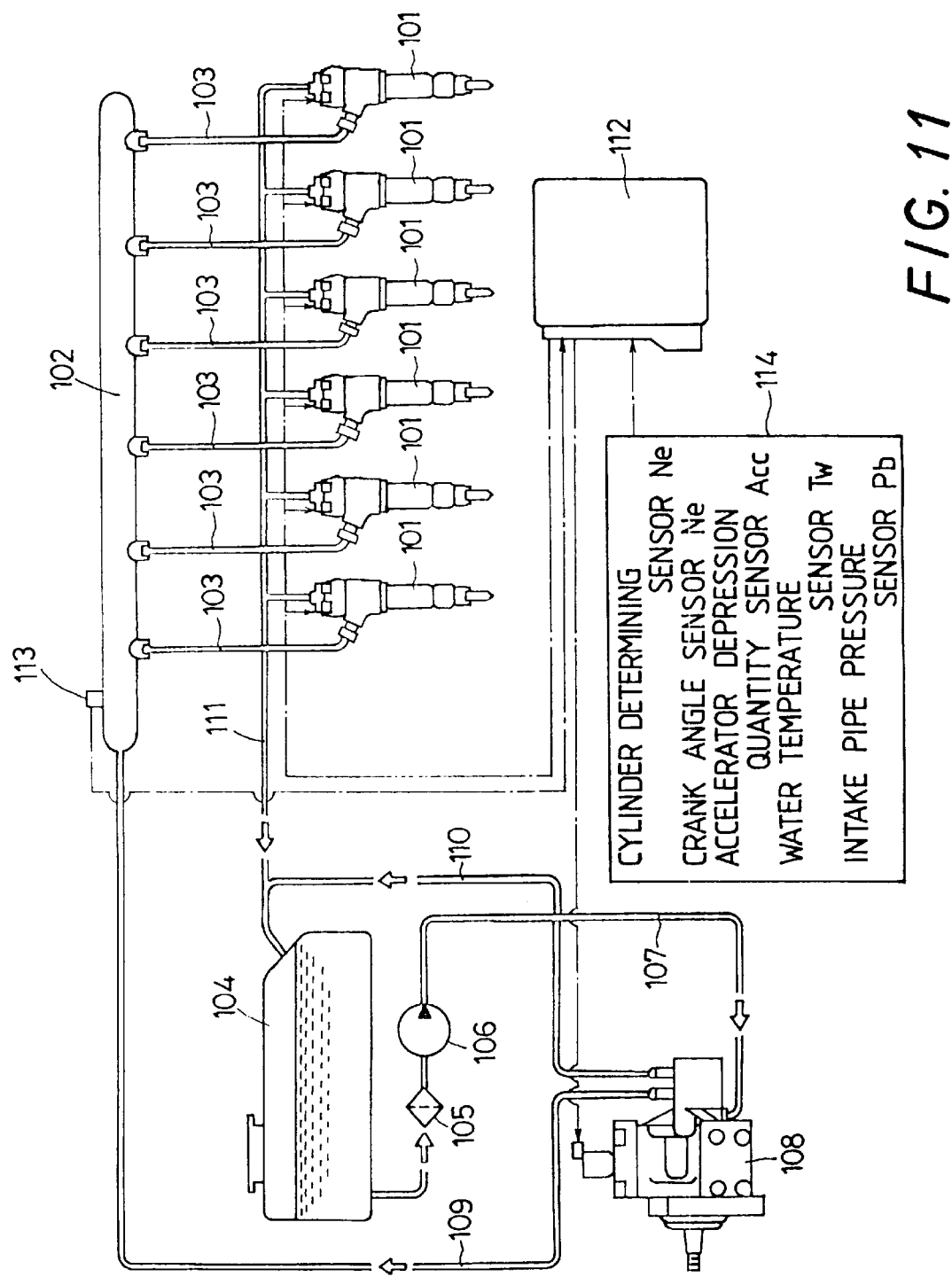
FIG. 11 is a diagrammatic view showing an accumulator fuel injection system which uses high-pressure fuel as its working fluid.
Figure 12:
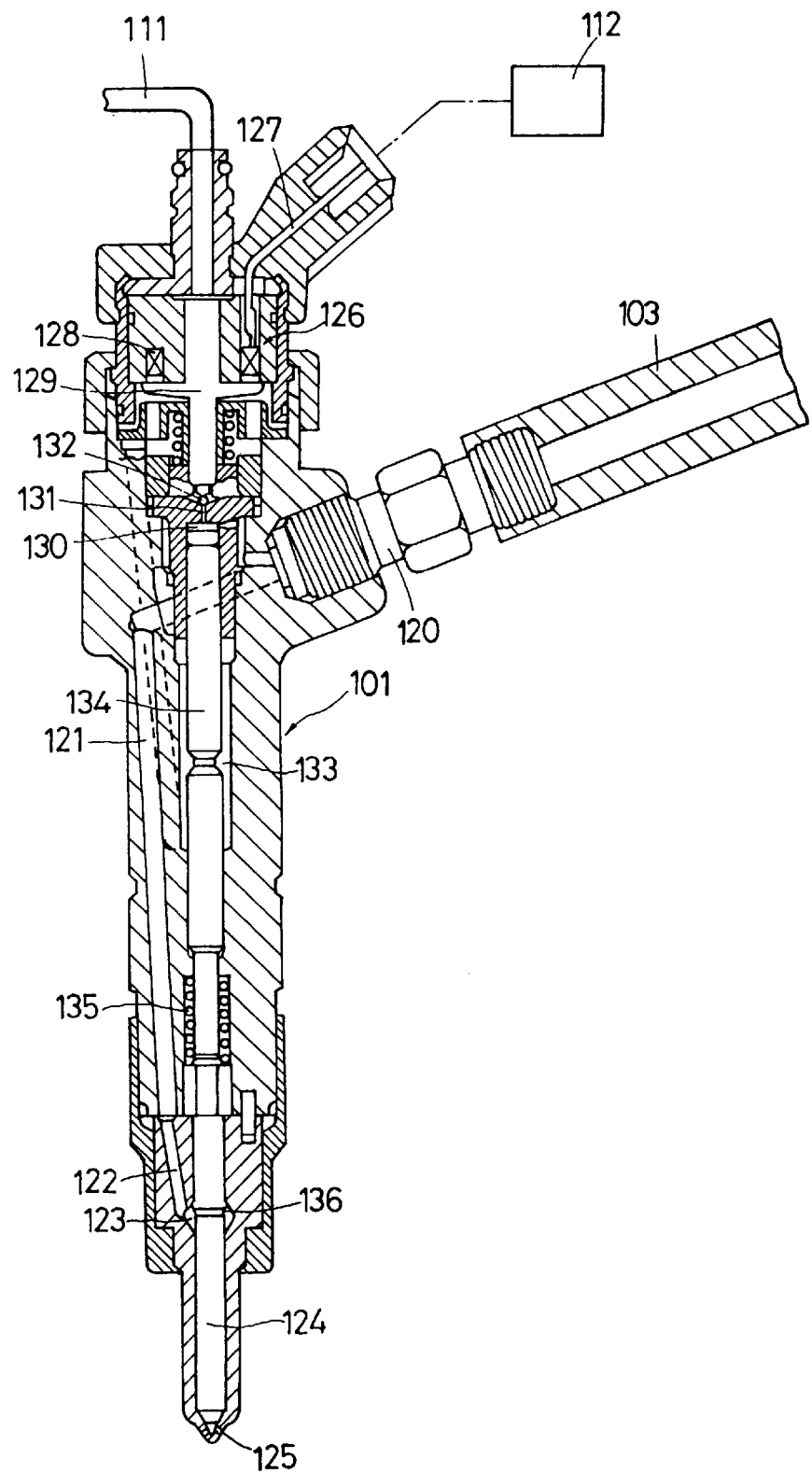
FIG. 12 is a cross-sectional view of an injector used in the accumulator fuel injection system shown in FIG. 11.

The outline of engine fuel injection control according to this invention will be described with reference to FIG. 1. In this control flowchart, the following steps are identical to the corresponding steps shown in FIG. 4, that is, the step of determining a target injection quantity Qt which is needed at the present time (S1), the step of determining timing at which to read in a detected accumulator pressure Pr (S2), the step of calculating an accumulator pressure Pr required for calculating a pulse width PW of a command pulse to be supplied to the solenoid valve of each injector (S3), the step of calculating the command pulse width PW of the command pulse from a map based on the target injection quantity Qt determined at S1, the accumulator pressure Pr calculated at S3 and the like (S4), and the step of driving each injector on the basis of the command pulse width PW of the command pulse calculated at S4, a cylinder decision step (S5) and the step of determining fuel injection starting time (S6).

In this invention, the timing at which to read in the accumulator pressure Pr at S2 is set to injection timing, that is, timing corresponding to a constant sampling period like a constant period independent of injection starting time, or a constant crank angle. In this invention, not only the timing at which to read in the accumulator pressure Pr but also the result of a decision which is made as to injection timing at S6 is reflected in the calculation of the accumulator pressure Pri at injecting starting time, which accumulator pressure Pri is used for calculating the command pulse width PW at S3.

Figure 2:
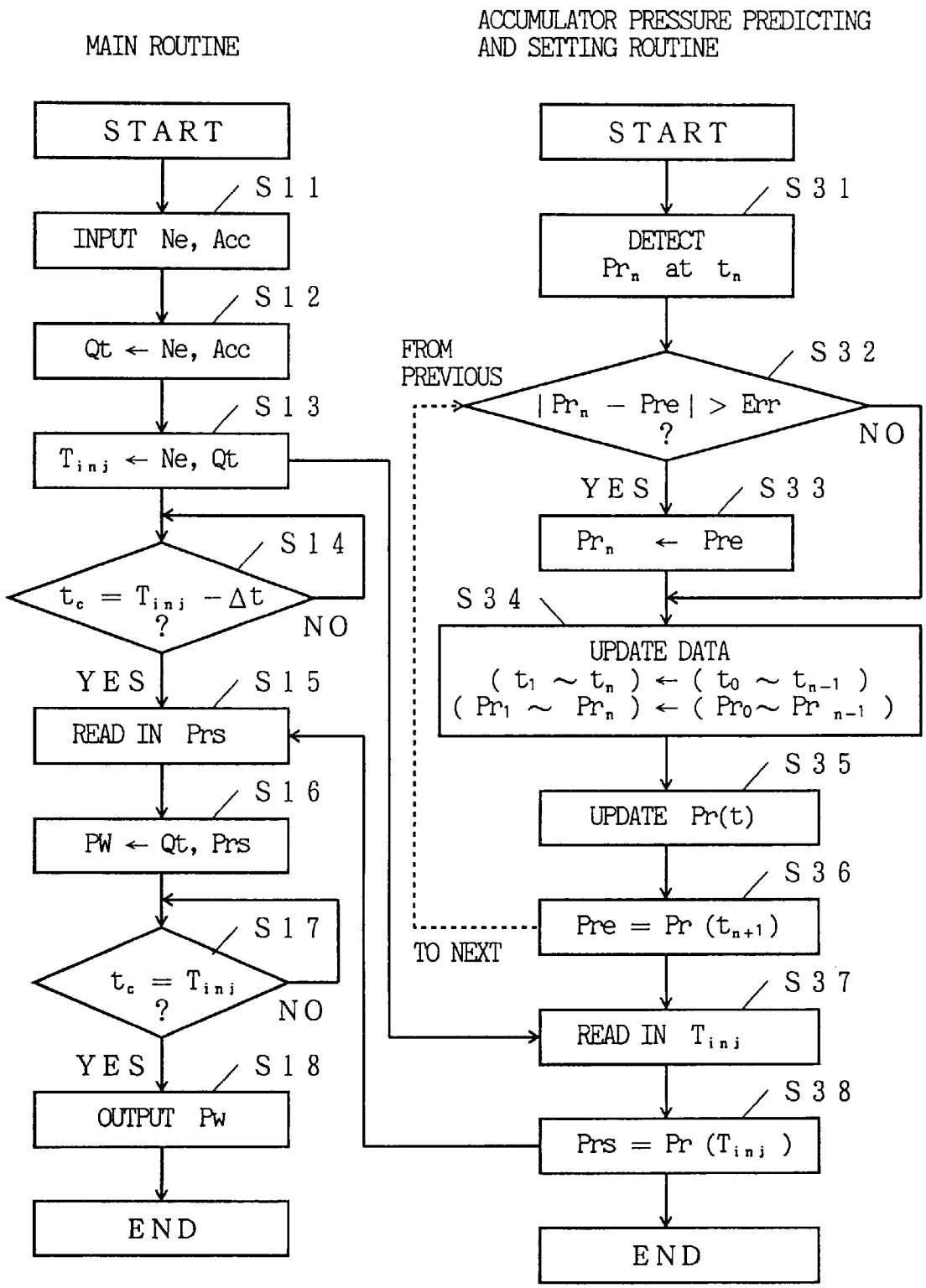
FIG. 2 is a view showing in detail a main routine and an accumulator pressure predicting and setting routine of the flowchart shown in FIG. 1.
Figure 3:
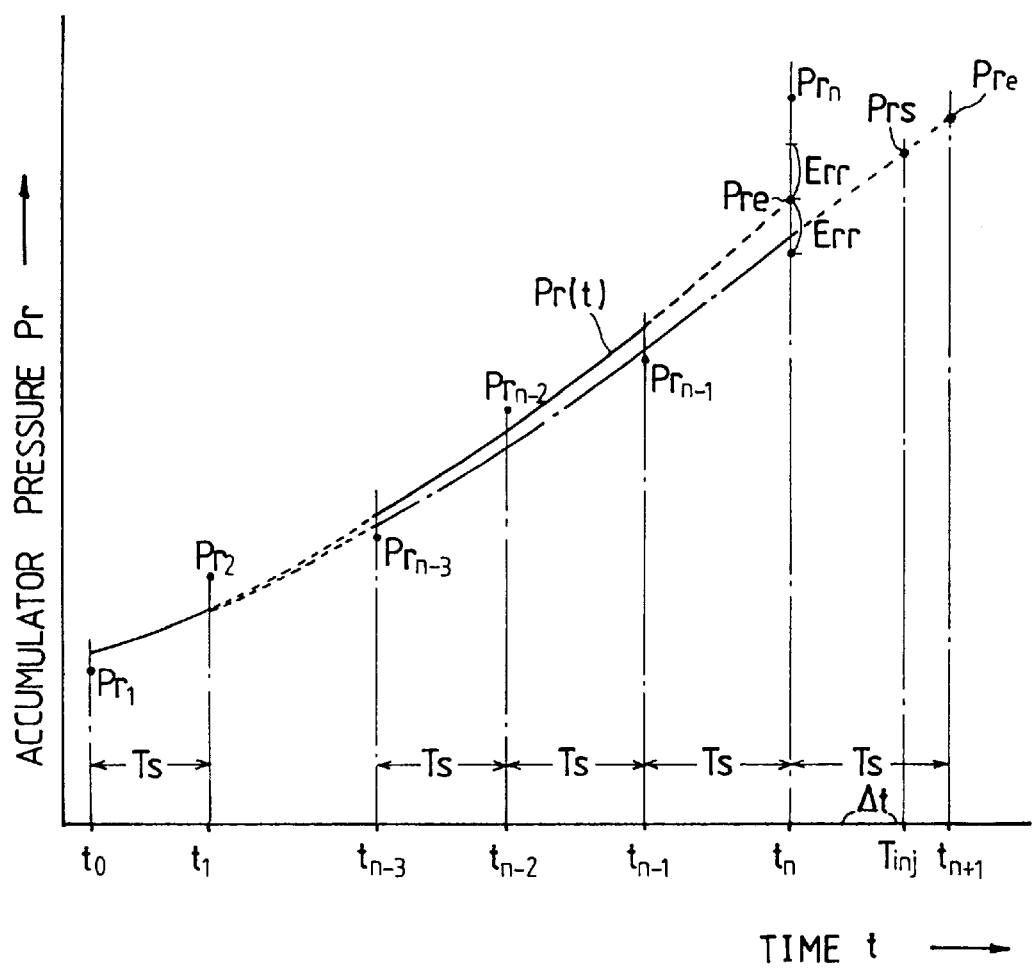
FIG. 3 is a graph aiding in describing an approximate function of an accumulator pressure Pr, prediction of the accumulator pressure Pr and setting of an accumulator pressure at fuel injection starting time.

In the above-described system, the calculation of the accumulator pressure Pri at injection starting time, which calculation is required for determining the command pulse width PW, is performed on the basis of the flowchart shown in FIG. 2. The routine shown on the right side of the flowchart of FIG. 2 is a routine for predicting and setting accumulator pressure at intervals of a constant period. FIG. 3 is a graph aiding in describing a variation with time in the accumulator pressure Pr, prediction and setting of the accumulator pressure Pr according to this invention, and setting of accumulator pressure at fuel injection starting time.

(1) If this routine is started, the pressure of working fluid in the accelerator at the present sampling time (time $t_n$) is detected as a detected value $Pr_n$ (S31).

(2) The accumulator pressure Pr is represented by an approximate function Pr(t) (shown by a solid line in FIG. 3) on the basis of the pressures detected by a plurality of sampling operations up to the previous sampling time (time $t_{n-1}$), and a predicted value Pre of accumulator pressure at the present sampling time (time $t_n$) is obtained from this approximate function Pr(t). A deviation between the detected value $Pr_n$ of accumulator pressure at the present sampling time and the predicted value Pre of accumulator pressure obtained from the approximate function is obtained, and this deviation is compared with a predetermined threshold (Err) (S32).

(3) If this deviation exceeds the predetermined threshold (Err), the predicted value Pre is substituted for the present accumulator pressure $Pr_n$ (S33).

(4) If the above deviation is not greater than the predetermined error threshold (Err), the detected value $Pr_n$ of accumulator pressure detected at the sampling time $t_n$ (detection time) is used without modification. However, if the deviation exceeds the predetermined threshold (Err), the predicted value Pre substituted for the detected value $Pr_n$ at S33 is used to update a group of detection times ($t_0$ to $t_{n-1}$ and accumulator pressures ($Pr_0$ to $Pr_{n-1}$) detected at these detection times to a group of detection times ($t_1$ to $t_n$ each of which is advanced by one sampling period Ts and accumulator pressures ($Pr_1$ to $Pr_n$) at the respective detection times ($t_1$ to $t_n$) (S34). These updated data are stored in a memory of the controller for the purpose of obtaining an approximate function. In the example shown in FIG. 3, since the deviation of the detected value $Pr_n$ of accumulator pressure at time $t_n$ from the predicted value Pre exceeds the threshold Err, the predicted value Pre, instead of the detected value $Pr_n$, is used as data for obtaining the approximate function.

(5) On the basis of data of the detection times and the accumulator pressures all of which have been updated at S34, the approximate function Pr(t) which serves as a time function of accumulator pressure is updated (S35). The updated approximate function Pr(t) is shown by a one-dot chain line in FIG. 3.

(6) This updated approximate function Pr(t) is used to predict an accumulator pressure at the next sampling time $t_{n+1}$ (the sampling period Ts after the previous time $t_n$) (S36). This predicted value Pre is compared with a detected value of accumulator pressure at S32 when this routine is executed at the next time.

(7) The next fuel injection starting time ($T_{inj}$) is read in from a main routine (S37).

(8) An accumulator pressure at the fuel injection starting time $T_{inj}$ read in at S37 is obtained from the above approximate function Pr(t) to be set as a set value Prs of accumulator pressure (S38). The set value Prs of accumulator pressure is used for calculating the command pulse width PW, as will be described later.

The routine shown on the left side of FIG. 2 is the main routine for obtaining a time duration during which to inject fuel from each injector. The details of control of this routine are as follows.

(1) If this routine is started, the engine speed Ne and the accelerator depression quantity Acc are inputted from the corresponding sensors (S11).

(2) The target injection quantity Qt is calculated from the previously obtained map on the basis of the engine speed Ne and the accelerator depression quantity Acc which have been inputted at S11 (S12).

(3) The fuel injection starting time Tinj is obtained from the previously obtained map on the basis of the engine speed Ne inputted at S11 and the target injection quantity Qt calculated at S12 (S13). The obtained fuel injection starting time $T_{inj}$ is sent to S37 of the accumulator pressure predicting and setting routine shown on the right side of FIG. 2, and is read in at S37.

(4) It is determined by means of a clock provided in the controller whether the present time $t_c$ is a time duration $\Delta t$ earlier than the fuel injection starting time $T_{inj}$ obtained at S13 (S14). If the present time $t_c$ has not yet reached a time instant which is earlier than the fuel injection starting time $T_{inj}$ by the time duration $\Delta t$, time continues to be counted until the present time $t_c$ reaches the time instant. Incidentally, the time duration $\Delta t$ is a time duration required to calculate the command pulse width PW of a command pulse on the basis of the target injection quantity Qt and the set value Prs of accumulator pressure, and may be shorter than the sampling period Ts.

(5) If the present time tc reaches the time instant which is earlier than the fuel injection starting time $T_{inj}$ by the time duration $\Delta t$, the accumulator pressure Prs at the fuel injection starting time $T_{inj}$ which has been obtained at S38 of the accumulator pressure predicting and setting routine shown on the right side of FIG. 2 (S15).

(6) The command pulse width PW of a command pulse to be supplied to the solenoid valve of each injector is calculated from the previously obtained map, from the target injection quantity Qt calculated at S12 and the set value Prs of accumulator pressure at the fuel injection starting time $T_{inj}$ which has been read in at S15 (S16).

(7) It is determined by means of the clock whether the present time $t_c$ is the fuel injection starting time $T_{inj}$ (S17). If the present time $t_c$ has not yet reached the fuel injection starting time $T_{inj}$ the clock continues to count time until the present time $t_c$ reaches the fuel injection starting time $T_{inj}$.

(8) If the present time $t_c$ reaches the fuel injection starting time $T_{inj}$, the command pulse width PW of the command pulse calculated at S16 is outputted (S18).

Incidentally, although in the above-described example a sampling interval is a constant time duration, sampling may be executed at intervals of a constant crank angle. It can be said that the method of sampling accumulator pressure at intervals of a constant crank angle is preferable to the method of sampling at intervals of a constant time duration in terms of control logic (the accuracy of an approximate function) because the former method can perform sampling corresponding to engine cycles without being affected by engine speeds. In addition, the approximate function can be obtained as a linear combination of a plurality of periodic functions such as trigonometric functions because accumulator pressure varies, for example, in the form of a repetition of approximate patterns during a steady state. During a transient state, the approximate function can be obtained as a linear combination of such a periodic function and a plurality of monotone increasing or decreasing functions. Since a specific mathematical calculation method is not the subject matter of this invention, further detailed description is omitted.

INDUSTRIAL APPLICABILITY

Since this invention is construction as described above, it is possible to highly accurately predict an accumulator pressure at fuel injection by using an approximate function of accumulator pressure, without picking up noise of the accumulator pressure, and it is possible to improve the accuracy of calculation of a control signal to be supplied to the solenoid valve of each injector, that is, command pulse width. Accordingly, the error difference between target fuel injection quantity and actual fuel injection quantity is decreased and control of the fuel injection quantity in each injection cycle is improved, whereby it is possible to improve engine performance such as exhaust gas performance, acceleration feeling given to drivers and fuel consumption.

What is claimed is:

1. A fuel injection method for an engine fuel injection system in which a working fluid fed out by a pump is stored in an accumulator, a target injection characteristic is set on the basis of detection signals from sensors for detecting an operating state of the engine, lifts of needle valves provided in bodies of the respective injectors are controlled by using a pressure of the working fluid introduced into injectors from the accumulator by control valves, and fuel is injected into combustion chambers of the engine from injection holes formed in the respective bodies and opened by the respective needle valves in accordance with the target injection characteristic, characterized by detecting the pressure of the working fluid in the accumulator at a predetermined sampling period, obtaining an approximate function of the pressure of the working fluid in the accumulator on the basis of data on the pressure of the working fluid, obtaining from the approximate function a set value of the pressure of the working fluid at an injection starting time of the next fuel injection, and controlling the control valves on the basis of the set value of the pressure of the working fluid;

characterized by updating the approximate function during each sampling of the pressure of the working fluid in the accumulator, obtaining a predicted value of the pressure of the working fluid at the next sampling time from the updated approximate function, comparing a predetermined threshold with an absolute value of a deviation between the predicted value and a detected value of the pressure of the working fluid detected at the next sampling time, and reading in the detected value of the pressure of the working fluid and updating the data in response to the absolute value being not greater than the threshold, and reading in the predicted value and updating the data in response to the absolute value exceeding the threshold, the approximate function being updated on the basis of the data updated.

2. A fuel injection method for an engine according to claim 1, characterized in that the sampling period is a constant time period or a constant crank angle period.

3. A fuel injection method for an engine according to claim 1, characterized in that the working fluid is a working oil and the control valves are changeover valves which change over supply and discharge of the working fluid to and from pressure chambers which are formed in the bodies of the respective injectors and to which ends of the pressure intensifying pistons are exposed, so as to drive the pressure intensifying pistons for intensifying a pressure of the fuel.

4. A fuel injection method for an engine according to claim 1, characterized in that the working fluid is a working fuel and the control valves are opening/closing valves which control discharge of the fuel from balance chambers so as to control a pressure of the fuel supplied to the balance chambers which are formed in the bodies of the respective injectors and to which are exposed ends of control pistons for controlling the respective needle valves.

5. A fuel injection method for an engine according to claim 1, characterized in that the target injection characteristic is the injection starting time and a fuel injection quantity at the next fuel injection and driving time durations for the respective control valves are controlled on the basis of the fuel injection quantity and the set value of the pressure of the working fluid obtained at the injection starting time.

6. A fuel injection method for an engine according to claim 5, characterized in that the control valves are solenoid valves provided with solenoids excited by command pulses having pulse widths corresponding to the respective driving time durations.

7. A fuel injection apparatus for an engine comprising, an accumulator for storing a working fluid fed out by a pump, injectors having bodies in which injection holes for injecting fuel into combustion chambers of the engine are respectively formed and in which needle valves for opening and closing the respective injection holes are respectively accommodated, sensors for detecting operating states of the engine, control valves provided in said respective injectors for controlling supply and discharge of the working fluid so as to use a pressure of the working fluid supplied from said accumulator, and a controller for setting a target injection characteristic on the basis of detection signals from said sensors and for driving said control valves to control lifts of said respective needle valves on the basis of the pressure of the working fluid so as to execute fuel injection according to the target injection characteristic, wherein said controller obtains an approximate function of the pressure of the working fluid in said accumulator on the basis of detected data on the pressure of the working fluid at a determined sampling period, obtains a set value of the pressure of the working fluid at an injection starting time of the next fuel injection from the approximate function, and controls said control valves on the basis of the set value;

wherein the controller updates the approximate function for each sampling of the pressure of the working fluid in said accumulator, obtains a predicted value of the pressure of the working fluid at the next sampling time from the updated approximate function, compares a predetermined threshold with an absolute value of a deviation between the predicted value and a detected value of the pressure of the working fluid detected at the next sampling time, reads in the detected value of the pressure of the working fluid and updates the data in response to the absolute value being not greater than the threshold, and reads in the predicted value and updating the data in response to the absolute value exceeding the threshold, the approximate function being updated on the basis of the data updated.

8. A fuel injection apparatus for an engine according to claim 7, wherein the sampling period is a constant time period or a constant crank angle period.

9. A fuel injection apparatus for an engine according to claim 7, wherein the working fluid is a working oil and said control valves are change over valves which change over between supply and discharge of the working fluid to and from pressure chambers which are formed in the bodies of said respective injectors and to which ends of said pressure intensifying pistons are exposed, so as to drive said pressure intensifying pistons for intensifying a pressure of the fuel.

10. A fuel injection apparatus for an engine according to claim 7, wherein the working fluid is a working fuel and said control valves are opening/closing valves which control discharge of the fuel from balance chambers so as to control a pressure of the fuel supplied to the balance chambers which are formed in the bodies of said respective injectors and to which are exposed ends of control pistons for controlling said respective needle valves.

11. A fuel injection apparatus for an engine according to claim 7, characterized in that the target injection characteristic is the injection starting time and a fuel injection quantity at the next fuel injection and driving time durations for said respective control valves are controlled on the basis of the fuel injection quantity and the set value of the pressure of the working fluid obtained at the injection starting time.

12. A fuel injection apparatus for an engine according to claim 11, wherein said control valves are solenoid valves provided with solenoids excited by command pulses having pulse widths corresponding to the respective driving time durations.

* * * * *